US007917674B2

(12) United States Patent
Lin et al.

(10) Patent No.: US 7,917,674 B2
(45) Date of Patent: Mar. 29, 2011

(54) KVM SWITCH WITH PIP FUNCTIONS USING REMOTE DESKTOP SHARING TECHNIQUE

(75) Inventors: Ching Yun Lin, Taipei (TW); Yu-Ting Liang, Longtan (TW)

(73) Assignee: Aten International Co., Ltd., Shijr (TW)

( * ) Notice: Subject to any disclaimer, the term of this patent is extended or adjusted under 35 U.S.C. 154(b) by 232 days.

(21) Appl. No.: 12/255,320

(22) Filed: Oct. 21, 2008

(65) Prior Publication Data

US 2010/0100652 A1  Apr. 22, 2010

(51) Int. Cl.
G06F 13/38  (2006.01)
G06F 15/16  (2006.01)

(52) U.S. Cl. .............. 710/73; 710/38; 710/62; 709/208; 709/217; 709/224

(58) Field of Classification Search .......................... None
See application file for complete search history.

(56) References Cited

U.S. PATENT DOCUMENTS

| 7,240,111 | B2 | 7/2007 | VanHarlingen et al. | |
|---|---|---|---|---|
| 7,330,919 | B2* | 2/2008 | Zhang et al. | 710/72 |
| 2003/0112248 | A1 | 6/2003 | Pronkine | |
| 2004/0015980 | A1 | 1/2004 | Rowen et al. | |
| 2005/0125357 | A1 | 6/2005 | Saadat et al. | |
| 2005/0132403 | A1 | 6/2005 | Lee et al. | |
| 2005/0275641 | A1* | 12/2005 | Franz | 345/204 |
| 2007/0168481 | A1* | 7/2007 | Lambert et al. | 709/223 |
| 2007/0200858 | A1 | 8/2007 | Hsieh et al. | |
| 2007/0261097 | A1* | 11/2007 | Siegman et al. | 725/134 |
| 2007/0282748 | A1* | 12/2007 | Saint Clair et al. | 705/51 |
| 2008/0005414 | A1* | 1/2008 | Liu et al. | 710/62 |
| 2008/0062121 | A1* | 3/2008 | Huang et al. | 345/156 |
| 2008/0155533 | A1* | 6/2008 | Mittapalli et al. | 717/176 |
| 2008/0288677 | A1* | 11/2008 | Kirshtein | 710/67 |
| 2009/0083453 | A1* | 3/2009 | Hsueh et al. | 710/36 |
| 2009/0300510 | A1* | 12/2009 | Gantman et al. | 715/740 |
| 2009/0304011 | A1* | 12/2009 | Smith | 370/401 |

* cited by examiner

Primary Examiner — Henry W Tsai
Assistant Examiner — Michael Sun
(74) Attorney, Agent, or Firm — Chen Yoshimura LLP (57) ABSTRACT

A keyboard, video, mouse (KVM) switch implements a picture-in-picture (PIP) function to allow desktop images from multiple computers to be displayed on the user console monitor. The KVM switch switches a first one of the multiple computers to the user console in a manner. The KVM switch further establishes a desktop sharing and remote control relationship between the first computer and each of the other computers, so that the first computer acts as a client which can see the desktop of the other computers (servers) and control them. The desktop images of the other computers are displayed on the console monitor as windows, which can be moved and re-sized. Audio data from the other computer are also transmitted to the user console. The PIP function is primarily implemented in software and no special video processing hardware is required in the KVM switch.

23 Claims, 4 Drawing Sheets

KVM SWITCH WITH PIP FUNCTIONS USING REMOTE DESKTOP SHARING TECHNIQUE

This application is related to U.S. application Ser. No. 12/237,549, filed Sep. 25, 2008, entitled "REMOTE DESKTOP CONTROL SYSTEM USING USB INTERFACE AND METHOD THEREOF", which is herein incorporated by reference in its entirety.

BACKGROUND OF THE INVENTION

1. Field of the Invention

This invention relates to a keyboard, video, mouse (KVM) switch, and in particular, it relates to a KVM switch with picture-in-picture (PIP) functions.

2. Description of the Related Art

In a keyboard, video, mouse (KVM) switch system, a plurality of computers is connected to one or more user consoles via a KVM switch. Each user console includes a video display device (monitor), user input devices such as a keyboard and a mouse, and audio speakers (optional). Each computer is connected to a computer port and each user console is connected to a console port of the KVM switch. The KVM switch has a routing matrix to selectively connect each console port to a computer port. Thus, each user console can selectively access and control one of the computers as if the user console is directly plugged into that computer. The KVM switch typically implements an on-screen display (OSD) menu system to allow the user to interact with the KVM switch and control its functions, e.g., logging on to the switch, selecting which computer to access, etc.

In some KVM switch systems, a picture-in-picture (PIP) function is implemented in the KVM switch to allow the user to see video signals (desktop images) from multiple computers simultaneously. For example, U.S. Pat. No. 7,240,111 describes a KVM switch called a "management device" where desktop images, called "host windows", from multiple computers are displayed simultaneously on the monitor of the user console, see FIGS. 3 and 4 of that reference. This system allows the user to navigate among the computers by moving the mouse over the host window of the desired computer. The management device uses hardware to implement the PIP functions. In particular, the video signal displayed on the console monitor is generated by the management device using video signals from the multiple computers as input.

SUMMARY OF THE INVENTION

Accordingly, the present invention is directed to an improved KVM switch and related method for accessing two or more computers by a user console that substantially obviates one or more of the problems due to limitations and disadvantages of the related art.

The invention provides a KVM switch device that allows the user to access two or more computers connected to the KVM switch and view desktop images of two or more computers on the console monitor.

The present invention also provides such a KVM switch device without additional special video processing hardware.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the present invention, as embodied and broadly described, the present invention provides a keyboard, video, mouse (KVM) switch, which includes: at least one console port for connecting to a user console; a plurality of computer ports each for connecting to a computer; a switching structure coupled to the plurality of computer ports and the at least one console port for selectively connect video data and user input device data between the console port and a selected computer port; a plurality of communication controllers each coupled to one of the computer ports for communicating with the respective computers using a predetermined communication protocol; and a control circuit coupled to the plurality of communication controllers; wherein the control circuit includes a memory storing a client-side remote control program and a server-side remote control program for a desktop sharing and remote control application, and wherein in response to an instruction from the user console which selects a first one of the computer ports and a second one of the computer ports, the control circuit controls the switching structure to connect video data and user input device data between the console port and the selected first computer port, controls the communication controller for the selected first computer port to emulate a first mass storage device complying with the predetermined communication protocol, transfers the client-side remote control program to the emulated first mass storage device for execution by a first computer connected to the selected first computer port, controls the communication controller for the selected second computer port to emulate a second mass storage device and a user input device complying with the predetermined communication protocol, transfers the server-side remote control program to the emulated second mass storage device for execution by a second computer connected to the selected second computer port, and transfers data between the communication controllers for the first and second computer ports. Audio data can be transmitted along the same paths as the video data.

In another aspect, the present invention provides a method implemented in a KVM switch for accessing two or more computers by the user console, which includes: (a) storing a client-side remote control program and a server-side remote control program; (b) receiving a first user command to access a selected first computer connected to a first computer port; (c) in response to the first user command, connecting the first computer port to the console port to transfer video data and user input device data between the console port and the first computer port; (d) emulating a first mass storage device complying with a predetermined communication protocol for the first computer port and transferring a client-side remote control program to the emulated first mass storage device for execution by the first computer; (e) receiving a second user command to access a selected second computer connected to a second computer port; (f) in response to the second user command, emulating a second mass storage device and a user input device complying with the predetermined communication protocol for the second computer port and transferring a server-side remote control program to the emulated second mass storage device for execution by the second computer; and (g) transferring data between the emulated first mass storage device and the emulated second mass storage device and user input device. Audio data can be transmitted along the same paths as the video data.

In yet another aspect, the present invention provides a method in a KVM switch system for accessing two or more computers by the user console, which includes: (a) the user console issuing a first user command to access a selected first computer connected to a first computer port; (b) in response to the first user command, the KVM switch connecting the first computer port to the console port to transfer video data and user input device data between the console port and the first computer port; (c) the first computer transmitting video data of its desktop image to the user console via the KVM switch; (d) the user console displaying the video data received via the KVM switch on a console monitor; (e) the KVM switch emulating a first mass storage device complying with a predetermined communication protocol for the first computer port and transferring a client-side remote control program to the emulated first mass storage device for execution by the first computer; (f) the user console issuing a second user command to access a selected second computer connected to a second computer port; (g) in response to the second user command, the KVM switch emulating a second mass storage device and a user input device complying with the predetermined communication protocol for the second computer port and transferring a server-side remote control program to the emulated second mass storage device for execution by the second computer; (h) the KVM switch transferring data between the emulated first mass storage device and the emulated second mass storage device and user input device; (i) the second computer executing the server-side remote control program to transmit video data representing a desktop image of the second computer to the emulated second mass storage device and to receive user input device data from the emulated user input device; (j) the first computer executing the client-side remote control program to transmit user input device data to the emulated first mass storage device and to receive video data from the emulated first mass storage device; and (k) the first computer continuing to transmitting video data of its desktop image, including a desktop image of the second computer, to the user console via the KVM switch. Audio data can be transmitted along the same paths as the video data.

It is to be understood that both the foregoing general description and the following detailed description are exemplary and explanatory and are intended to provide further explanation of the invention as claimed.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment as well as some alternative embodiments of the present invention.

The present invention provides an improved KVM switch and related method in a KVM system that allows the user to view desktop images of multiple computers on the same console monitor, thereby accomplishing a picture-in-picture or PIP function. The PIP function does not require any special video processing hardware in the KVM switch, and is primarily implemented as software/firmware of the KVM switch. In addition, it does not require any special software to be installed on the computers. The desktop images of desired computers are displayed on the console monitor as windows, which can be moved (dragged) and re-sized by the user. In addition, audio data from the desired computers can be played on the speakers of the user console without additional cables. These functions are achieved by using a desktop sharing and remote control technique between two computers.

Desktop sharing techniques are sometimes referred to as VNC (Virtual Network Computing). VNC is a graphical desktop sharing system which allows one client computer to remotely control the server computer. In a VNC system, the server and client computers are connected by a network to exchange video data from the server to the client, and keyboard/mouse data from the client to the server.

A commonly owned U.S. application Ser. No. 12/237,549, filed Sep. 25, 2008, entitled "REMOTE DESKTOP CONTROL SYSTEM USING USB INTERFACE AND METHOD THEREOF", which is herein incorporated by reference in its entirety, describes a desktop sharing and remote control system where the server and the client computers are connected by a connecting device using the USB protocol. The connecting device includes a control unit (MCU) and two USB controllers that communicate with the server and client computers. The server-side USB controller emulates a USB CD-ROM/keyboard/mouse composite device; the client-side USB controller emulates a USB CD-ROM. The server continuously writes video data (desktop image) to the server-side emulated CD-ROM and the client continuously reads the data from the client-side emulated CD-ROM and applies it to its monitor. Keyboard and mouse data is transferred in the opposite direction as the video data via the client-side emulated CD-ROM and server-side emulated keyboard and mouse devices. The MCU transfers data between the two USB controllers. The connecting device stores application programs to be automatically executed by the server and client using autorun functions of the emulated CD-ROMs to accomplish plug-and-play.

Figure 1:
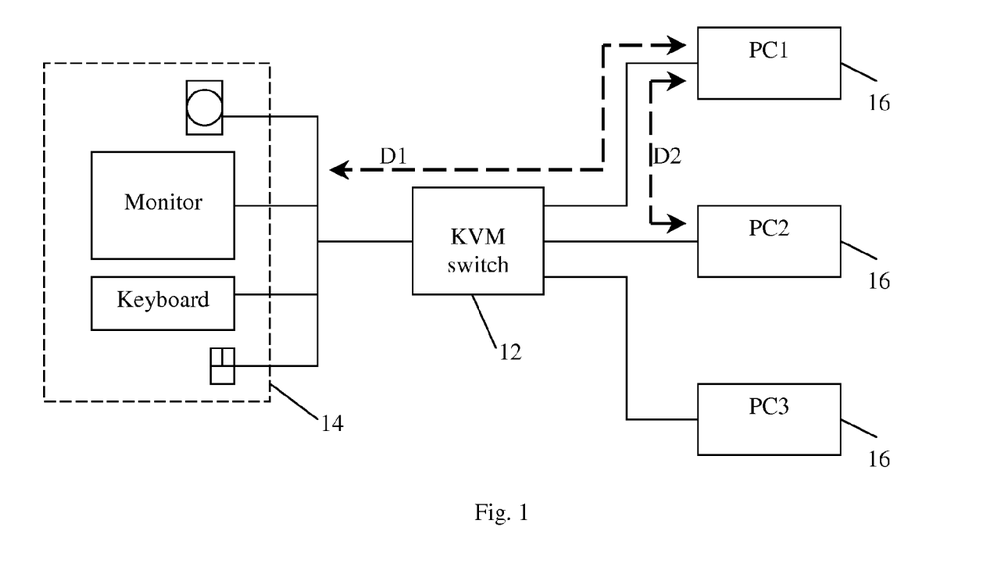
FIG. 1 illustrates the configuration and data paths of a KVM switch system according to an embodiment of the present invention.

The present invention implements a similar desktop sharing and remote control method using the KVM switch so that two or more computers connected to the KVM switch can establish a desktop sharing and remote control relationship between them. The overall configuration and data flow of a KVM system according to an embodiment of the present invention is shown in FIG. 1. One or more user consoles 14 and multiple computers 16 are connected to the KVM switch 12. Each computer 16 is connected to a computer port and each user console 14 is connected to a console port of the KVM switch 12. Each user console 14 includes a display device (monitor), one or more user input devices (e.g. a keyboard and a mouse), and a speaker (optional). A first one of the multiple computers, "PC1" in this example, is connected with the user console 14 by the KVM switch in a conventional manner. In other words, the KVM switch 12 routes video and audio data from the first computer port to the console port, and routes keyboard and mouse signals from the console port to the first computer port. The KVM switch 12 may process the signals in appropriate ways as a part of the signal routing. This data path is indicated by the dashed line "D1" in FIG. 1. A more detailed description of this KVM switching function is omitted here as it is well known in the art and may be implemented by any suitable switching structure.

A second computer, "PC2" in this example, is connected with the first computer PC1 by the KVM switch 12 in a desktop sharing and remote control relationship. In this relationship, the second computer PC2 is the server that is sharing its desktop image and being controlled, and the first computer PC1 is the client that is viewing the desktop image of the server and transmitting keyboard and mouse signals to control the server. The server executes a server-side remote control program, and the client executes a client-side remote control program, to accomplish the desktop sharing and remote control functions as will be described in more detail later. The KVM switch 12 acts in a similar role as the connecting device described in the above-referenced commonly owned U.S. patent application. The KVM switch 12, the server computer PC2 and the client computer PC1 cooperate with each other so that video data representing desktop images and audio data are transmitted from the server to the client via the KVM switch, and keyboard and mouse data are transmitted in the opposite direction. This data path is indicated by the dashed line "D2" in FIG. 1.

As a result, the monitor of the console device 14 displays the desktop image of the first computer PC1 because PC1 is switched to the console by the KVM switch 12, and displays the desktop image of the second computer PC2 as a window because PC1 and PC2 have a desktop sharing relationship. Likewise, the speaker of the console device 14 plays the audio data of the first computer PC1 as well as the second computer PC2 because the audio data of PC2 has been mixed with the audio data of PC1 and is present at the audio port of PC2. The user can control both the first and the second computers using the user input devices (keyboard and mouse) as if they are directly plugged into the first computer.

Figure 2:
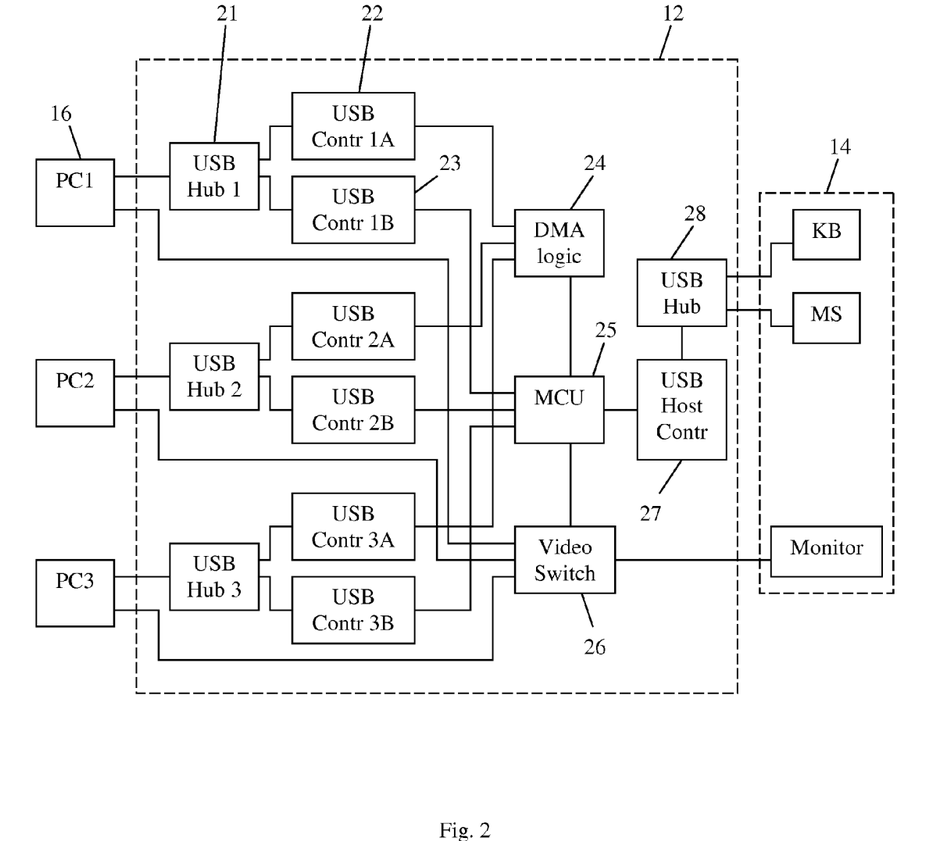
FIG. 2 illustrates the structure of the KVM switch according to an embodiment of the present invention.

Referring to FIG. 2, to enable the desktop sharing and remote control relationship between two computers connected to the KVM switch 12, the KVM switch is provided with a set of components, including an additional USB device controller for each computer port and a logic connected to these USB device controllers. (In FIG. 2, to avoid overcrowding, when parallel sets of structures are provided, only one set is labeled with reference numbers.) As shown in FIG. 2, the KVM switch 12 includes multiple computer ports (three shown in this example) each for connecting to a computer 16, and a console port for connecting to a user console 14. Each computer port includes a video connection which is coupled to a video switch 26, and a USB connection which is coupled to the upstream end of a USB hub 21. Two down stream ends of the USB hub 21 are coupled to a first USB device controller 22 and a second USB device controller 23. In one embodiment, the first USB controller 22 is a high speed controller and the second USB controller 23 is a low speed controller. The first USB device controller 22 of each computer port is coupled to a DMA (direct memory access) logic 24. The second USB device controller 23 of each computer port is coupled to a control circuit such as a microcontroller unit MCU 25. The MCU 25 generally controls the functions of the KVM switch 12, and includes appropriate memories (not shown) storing control firmware and other programs and data. The MCU 25 is coupled to a USB host controller 27 which is coupled to the console port of the KVM switch 12. A USB hub 28 may be provided between the USB host controller 27 and the console port if the console port has two separate USB connectors for a keyboard and a mouse. The video switch 26 is connected to the monitor port of the console port of the KVM switch 12.

The second USB controllers 23, the MCU 25, the video switch 26, the USB host controller 27, and the USB hub 28 (if present) are components of a KVM switch. The video switch 26 switches the video signal from the selected computer port to the monitor of the user console 14. The second USB controllers 23 and the USB host controller 27 control the communication of keyboard and mouse signals with the computers 16 and the user console 14, respectively, using the USB protocol. The MCU 25 transmits the keyboard and mouse signals from the console port via the host USB controller 27 to the selected computer port via the second USB device controller 23. The structures for switching the audio data are not shown in FIG. 2 to avoid overcrowding, but they typically include audio codecs, an audio switch or audio mixer, etc. Of course, other suitable structures may be used to implement the KVM switching functions for video, audio, keyboard and mouse signals. More generally, the KVM switch 12 includes a switching structure for performing the function of switching the video, audio, keyboard and mouse signals between the console port and the computer ports. Other structures not shown in FIG. 2 may included in the KVM switch 12, such as structures for generating OSD menus, etc.

The plurality of first USB device controllers 22, the DMA logic 24 and the MCU 25, which are collectively referred to herein as the desktop sharing and remote control section of the KVM switch 12, implement the desktop sharing and remote control function of the KVM switch 12. The first USB controllers 22 communicate with the computers connected to the corresponding computer ports using the USB protocol. Each first USB controller 22 emulates one or more USB devices for the connected computer. If the connected computer is to function as a client in the desktop sharing and remote control relationship, the USB controller 22 emulates a USB CD-ROM device. In other words, to the client computer, the USB controller 26 appears to be a CD-ROM communicating with the client using the USB protocol. The emulated CD-ROM device for the client contains a client-side remote control program to be executed by the client computer. If the connected computer is to function as a server in the desktop sharing and remote control relationship, the USB controller 22 emulates a USB CD-ROM/keyboard/mouse composite device. In other words, to the server computer, the USB controller 22 appears to be a CD-ROM/keyboard/mouse composite device communicating with the server using the USB protocol. The emulated CD-ROM devices for the server contain a server-side remote control program to be executed by the server computer.

The DMA logic 24 transfers data between the USB controllers 22. The MCU 25 controls the USB controllers 22 via the DMA logic 24 so that the USB controllers emulate the appropriate USB devices. The MCU 25 also transfers appropriate remote control programs (server-side program or client-side program) stored in its memory to the emulated CD-ROM devices so that they can be presented to the client or server. Although in the example of FIG. 2 the DMA logic 24 and the MCU 25 are two separate components, they can be combined into one component (a control circuit) that performs the above-described functions.

Because the emulated devices (USB CD-ROM or USB CD-ROM/keyboard/mouse) are standard devices, computers running popular operating systems such as Window, Mac, Linux, etc., can use their existing drivers to communicate with the USB controllers without requiring any special driver to be installed. Methods for emulating a USB CD-ROM device or a USB CD-ROM/keyboard/mouse composite device are known in the art and more detailed descriptions are omitted here. In addition, the emulated CD-ROMs for the server and client preferably have an auto-run function, which may be implemented by providing auto-run files on the emulated CD-ROM. Thus, the client-side and server-side remote control programs on the emulated CD-ROMs will be automatically executed by the client and server computers when the emulated CD-ROMs are presented, and the user does not need to perform a separate program installation step on the client or server computers.

The server-side remote control program instructs the server computer to continuously transfer video representing desktop images and audio data generated by the server to the corresponding USB controller 22 by writing the video and audio data to the emulated CD-ROM device, as well as to continuously read the keyboard and mouse data from the emulated keyboard and mouse devices. The server computer uses the keyboard and mouse data to control its functions.

The client-side remote control program instructs the client computer to continuously receive video and audio data from the corresponding USB controller 22 by reading the video and audio data from the emulated CD-ROM device. The client computer applies the video and audio data to its monitor and speaker ports. The audio data from the server is typically mixed with the audio data from the client computer itself and applied to the speaker port. In a preferred embodiment, the server's desktop image is presented as a window (referred to here as the remote control window) on the client's desktop. The client receives information from the server regarding the resolution of the server's desktop image, and the client draws the remote control window and its content based on that information. The remote control window may be dragged (moved) and resized. In a preferred embodiment, the client-side remote control program creates the remote control window, but the actual functions of drawing and managing the window (dragging, resizing, etc.) are performed by the operating system of the client computer. Alternatively, these functions can be performed by the client-side remote control program. The client-side remote control program also instructs the client computer to obtain keyboard and mouse events that are intended for the server. For example, the client can determine whether a keyboard or mouse event is intended for controlling the server based on whether the input cursor is located within the remote control window and/or whether that window is the top window on the client's desktop. This is also a function of the client's operating system. If the keyboard or mouse event is intended for the server, the client continuously transfers the keyboard and mouse data to its corresponding first USB device 22 (which emulates a CD-ROM).

As the video and audio data are continuously transferred from the server computer via the KVM switch 12 to the client computer, and the keyboard and mouse data are continuously transferred in the opposite direction, graphical desktop sharing and remote control of the server computer is accomplished.

In FIG. 2, assuming that PC2 is acting as the server and PC1 is acting as the client in the desktop sharing and remote control relationship, the video and audio data are transmitted from PC2 to PC1 via USB hub 2, USB device controller 2A (emulating a CD-ROM), DMA logic, USB device controller 1A (emulating a CD-ROM), and USB hub 1. The keyboard and mouse data from PC1 to PC2 may be handled in various ways. In one implementation, the keyboard and mouse data from PC1 is transmitted to PC2 along the same path but in the opposite direction as the video and audio data described above, while the USB controller 2A emulates a USB CD-ROM/keyboard/mouse composite device for the server PC2. In an alternative implementation, the keyboard and mouse data is transmitted via the second USB device controllers 23 and the MCU 25. In the latter implementation, the MCU transfers the keyboard and mouse data between the second USB controllers 23.

The video and audio data from the server PC2 are transferred using a bulk data transfer method via the USB CD-ROM devices emulated by the two USB controllers 22. The DMA logic 24 transfers the data between the two USB controllers 22. Details of the bulk data transfer method are described in the above-referenced commonly owned U.S. patent application and omitted here. The keyboard and mouse data from the client PC1 can be either transferred as bulk data, or, alternatively, they can be packaged into the SCSI command sent by the client PC1 to its corresponding USB controller 1A. In the latter method, the DMA logic 24 processes the command to extract the keyboard and mouse data, and transfers the keyboard and mouse data to the USB controller 2A. The USB controller 2A outputs the keyboard and mouse data to the server PC2 via the respective endpoints of the emulated USB keyboard and mouse devices. Transferring the keyboard and mouse data with the SCSI command in this manner increases the bulk data transfer efficiency.

Other information that needs to be transmitted from the client to the server, such as user interface configuration information, hardware information, etc., can be transmitted using keyboard hotkeys. For example, a function key may be used to turn on and off the audio. When the user at the client side pressed the function key, the hotkey signal is transmitted in the same matter as other keyboard data. The server-side remote control program on the server, upon receiving the hotkey data, responds accordingly.

Because the user console 14 is connected to the first computer by the KVM switch 12 as if the user console is directly plugged into the first computer (e.g. PC1), the monitor of the user console will display the desktop image of the first computer which will include a window that shows the desktop of the second computer (e.g. PC2) if the first computer is in the desktop sharing and remote control relationship with the second computer. When the user inputs a user input device signal (e.g. keyboard or mouse signal) from the user console 14, the input device signal is received by the first computer (PC1) as if the user console is directly plugged into the first computer, and the first computer applies the input device signal either to the first computer or to the second computer depending on which window is active, as described earlier.

The first computer may simultaneously have a desktop sharing and remote control relationship with more than one second computer. In such a situation, the DMA logic 24 of the KVM switch 12 transfers the video data from all second computers (via the respective USB controllers) to the USB controller for the first computer. As a result, multiple remote control windows are displayed on the console monitor. The user selectively controls the first computer or one of the second computers by activating the appropriate window. The DMA logic 24 also selectively transfers the keyboard and mouse signals from the USB controller 1A for the first computer PC1 to the USB controller 2A or 3A of the intended second computer (PC2 or PC3).

Figure 3:
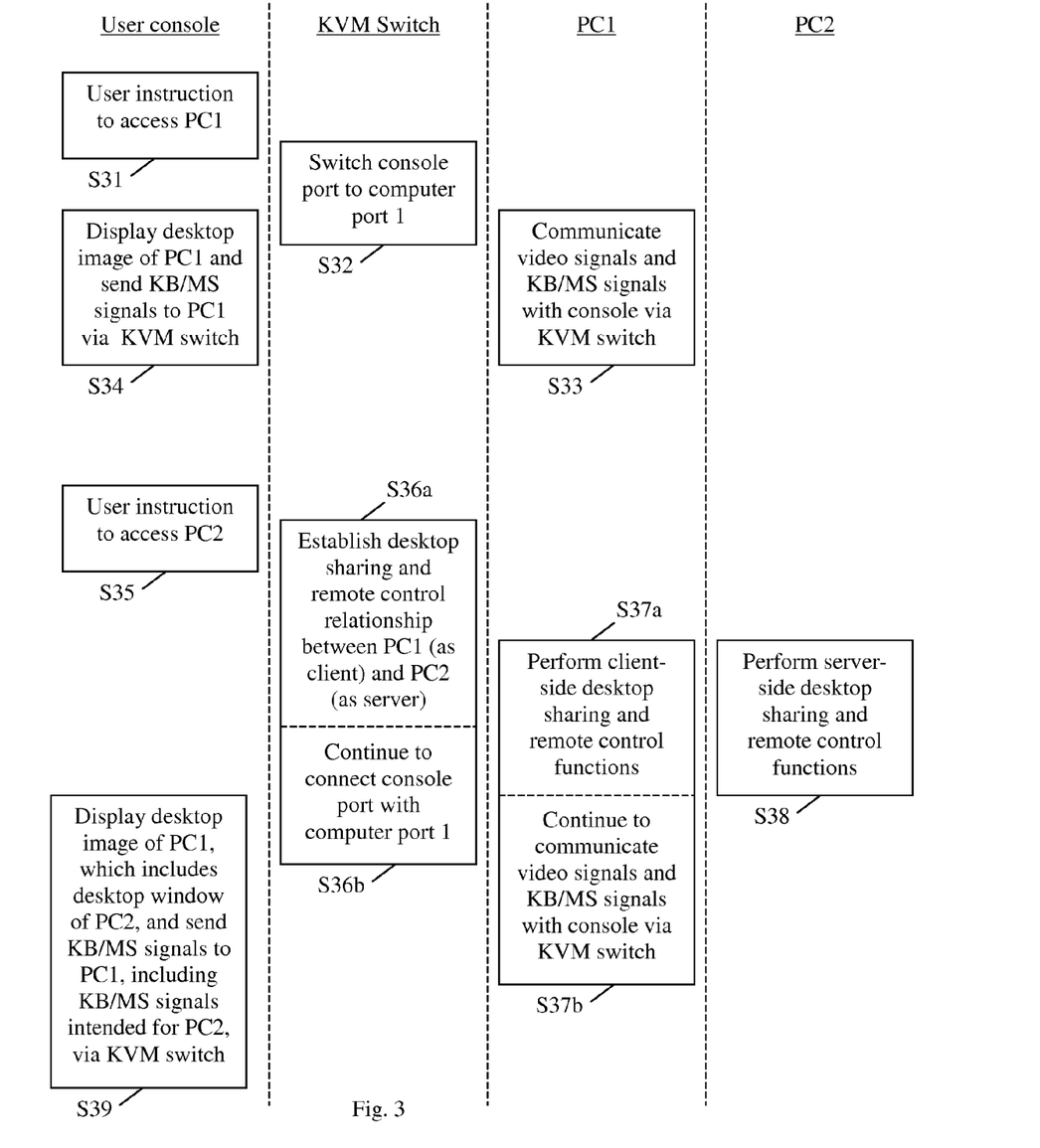
FIGS. 3 and 4 are flow diagrams illustrating an operation of the KVM switch system according to an embodiment of the present invention.

The operation of the KVM switch system is described with reference to FIGS. 3 and 4. Referring to FIG. 3, first, the user (using the user console 14) instructs the KVM switch 12 to access a first computer (PC1 in this example) (step S31). This may be done by using an OSD menu or a hotkey. At this time, because no computer is currently switched to the console, the KVM switch switches the computer port for PC1 to the console port (step S32). This is the switching function of the KVM switch 12. Once PC1 is switched to the user console, PC1 communicates video signal and keyboard and mouse signals with the console via the KVM switch (step S33). At the same time, the console displays the desktop image of PC1 and sends keyboard and mouse signals to PC1 via the KVM switch (step S34). This accomplishes the control of PC1 by the user console.

While the first computer PC1 is connected to the user console via the KVM switch, if the user wishes to access a second computer (PC2 in this example) in addition to PC1, the user issues an instruction to the KVM switch (step S35). This may be done by using an OSD menu or a hotkey. Note that although PC2 and PC1 will be accessed by the user console via different mechanisms, the user commands do not need to make any distinctions; the user simply requests access to PC2. At this time, because a first computer PC1 is already switched to the console port by the KVM switch 12, the KVM switch proceeds to establish a desktop sharing and remote control relationship between PC1 and PC2 (step S36a). The KVM switch treats the first computer (PC1) which is currently switched to the console as the client and the second computer to be controlled (PC2) as the server in the desktop sharing and remote control relationship. The MCU 25 of the KVM switch controls the USB controller 1A and USB controller 1B to emulate appropriate USB mass storage devices and to present the client-side and server-side remote control programs to PC1 and PC2, respectively, in the manner described earlier. In the mean time, the KVM switch 12 continues to switch the first computer PC1 to the console port (step S36b).

The first computer PC1 and the second computer PC2, upon being presented with the emulated USB mass storage devices, automatically execute the client-side and server-side remote control programs, respectively, and thereafter perform the client-side functions and the server-side functions of the desktop sharing and remote control relationship, respectively, in the manner described earlier (steps S37a and S38). As a result, the second computer PC2 transmits video data of its desktop image to the first computer PC1 via the KVM switch 12, and the first computer PC1 transmits keyboard and mouse signals to the second computer PC2 via the KVM switch.

In the mean time, the first computer PC1 continues to transmit video data to and receive keyboard and mouse signals from the user console 14 via the switching function of the KVM switch 12 (step S37b). The user console 14 continues to receive video data from the first computer PC1 and display it on the monitor of the user console (step S39). As a result of the desktop sharing and remote control relationship between PC1 and PC2, the desktop image of the first computer PC1 displayed on the console monitor now includes a remote control window containing the desktop image of the second computer PC2. The user can now communicate with the second computer PC2 by activating the remote control window (e.g. placing the input cursor inside the window), and can move or resize the remote control window.

In the above descriptions, step S36a (establishing desktop sharing and remote control relationship between PC1 and PC2) is performed when the user instructs the KVM switch to access the second computer PC2. Alternatively, the KVM switch can emulate the USB mass storage device for the first computer PC1 (the client) so that PC1 can start to execute the client-side remote control program as soon as step S32 (switching PC1 to the console port) is performed. Then, when the KVM switch receives the user instruction to access the second computer PC2, it emulates the USB mass storage device/keyboard/mouse for the second computer PC2 and PC2 starts to run the server-side remote control program.

While PC1 and PC2 are being accessed, if the user instructs the KVM switch 12 to access another second computer (PC3 for example), the KVM switch establishes a desktop sharing and remote control relationship between PC3 and PC1. This step is similar to step S36a, except that the KVM switch only needs to emulate a USB mass storage device for PC3 (as a server) because the emulated USB device for the client PC1 already exists. These steps are not shown in FIG. 3.

Further, while PC1 and PC2 are being accessed, if the user instructs the KVM switch 12 to release access of the second computer PC2, the MCU 25 of the KVM switch 12 controls the USB controller 2A for PC2 to emulate a removal event that removes the emulated USB mass storage device/keyboard/mouse device. The emulated USB device for PC1 may be removed or may remain (it will remain if there are other second computers being remotely controlled). These steps are not shown in FIG. 3.

Figure 4:
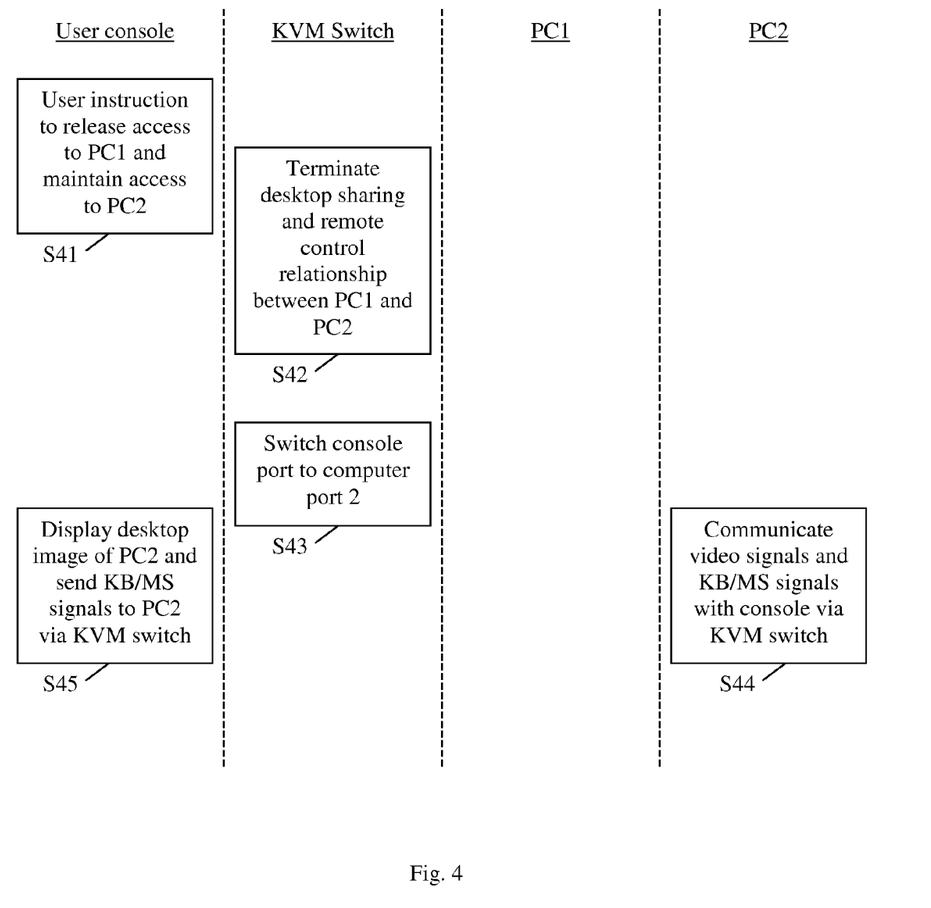

Referring to FIG. 4 (the timing sequence of FIG. 4 continues from FIG. 3), while PC1 is switched to the user console 14 by the KVM switch function and PC2 is in a desktop sharing and remote control relationship with PC1, the user may instruct the KVM switch to release access of PC1 and maintain access of PC2 (step S41). In response, the KVM switch terminates the desktop sharing and remote control relationship between PC1 and PC2 (step S42). This is done by the USB controllers 1A and 2A emulating removal events to remove the respective emulated USB devices for PC1 and PC2. The KVM switch then switches PC2 to the user console 14 using the switching function of the KVM switch (step S43). Thereafter, PC2 communicates video signal and keyboard and mouse signals with the console via the KVM switch (step S44). The console displays the desktop image of PC2 and sends keyboard and mouse signals to PC2 via the KVM switch (step S45).

In the manner described above, the system is reconfigurable dynamically in that any of the computers can be directly switched to the user console, and all computers can be added to remove dynamically.

Although in the above descriptions the connecting device 16 emulates CD-ROMs for the server and the client, the device 16 can emulate other mass storage devices complying with the USB Mass Storage Class standard, such as DVD-ROMs, flash drives, hard disk drives, floppy disk drives, etc. CD-ROMs are preferred as emulated devices because they provide convenient auto-run functions.

Although in the above description the USB controller for server 26 emulates both a keyboard device and a mouse device, it may alternatively emulate only a keyboard device or only a mouse device (which are individually or collectively referred to as a user input device).

Although in the above descriptions the client-side and server-side remote control programs are different programs, they can also be in the form of a combined program that contains both code for the client-side functions and code for server-side functions. The same combined program is loaded in both the server and the client computers; the client computer executes the client-side code and the server computer executes the server-side code automatically.

Although USB is used in the above descriptions as the interface and communication protocol between the server, the connecting device and the client, the invention may be implemented using other standard interfaces and communication protocols, such as Firewire®, etc., including those that may come into existence in the future. Preferably, the protocol should be widely supported by a large number of computers used at the time.

As pointed out earlier, in the configuration of FIG. 1, multiple user consoles 14 may be connected to the KVM switch. A KVM switch that can connect multiple user consoles is sometimes referred to as a matrix KVM. Each user console may be connected to one first computer and additionally control one or more second computers in the manner described above. Further, the user console 14 may be connected to the KVM switch 12 via a network using an appropriate network protocol. A KVM switch that can connect to a user console over a network is sometimes referred to as network-enable KVM or KVM over IP.

Using the method described herein, when any one computer (first computer) is switched to the user console by the KVM switch, the user can access and control any other computers (second computers) via the desktop sharing and remote control function provided by the KVM switch. Compared to PIP functionalities which require special video processing hardware in the KVM switch, the system according to embodiments of the present invention reduces hardware cost. At the same time, there is no need to install special software program on the computers being controlled, and no modification of the computers is required. Moreover, the user console can receive audio data from all accessed computers without any special audio processing or switching hardware in the KVM switch.

It will be apparent to those skilled in the art that various modification and variations can be made in the improved KVM apparatus and related method of the present invention without departing from the spirit or scope of the invention. Thus, it is intended that the present invention cover modifications and variations that come within the scope of the appended claims and their equivalents.

What is claimed is:

1. A keyboard, video, mouse (KVM) switch, comprising:
at least one console port for connecting to a user console;
a plurality of computer ports each for connecting to a computer;
a switching structure coupled to the plurality of computer ports and the at least one console port for selectively connect video data and user input device data between the console port and a selected computer port;
a plurality of communication controllers each coupled to one of the computer ports for communicating with the respective computers using a predetermined communication protocol; and
a control circuit coupled to the plurality of communication controllers;
wherein the control circuit includes a memory storing a client-side remote control program and a server-side remote control program for a desktop sharing and remote control application, and
wherein in response to an instruction from the user console which selects a first one of the computer ports and a second one of the computer ports, the control circuit controls the switching structure to connect video data and user input device data between the console port and the selected first computer port, controls the communication controller for the selected first computer port to emulate a first mass storage device complying with the predetermined communication protocol, transfers the client-side remote control program to the emulated first mass storage device for execution by a first computer connected to the selected first computer port, controls the communication controller for the selected second computer port to emulate a second mass storage device and a user input device complying with the predetermined communication protocol, transfers the server-side remote control program to the emulated second mass storage device for execution by a second computer connected to the selected second computer port, and transfers data between the communication controllers for the first and second computer ports.

2. The KVM switch of claim 1, wherein the predetermined communication protocol is the Universal Serial Bus (USB) protocol and the communication controllers are USB device controllers.

3. The KVM switch of claim 1, wherein the emulated first and second mass storage devices are CD-ROM devices.

4. The KVM switch of claim 3, wherein the memory further stores first and second auto-run files, and
wherein the control circuit transfers the first and second auto-run files to the emulated first and second CD-ROM devices, respectively.

5. The KVM switch of claim 1,
wherein the client-side remote control program is configured to cause the first computer to transmit user input device data to the emulated first mass storage device and to receive video data from the emulated first mass storage device, and
wherein the server-side remote control program is configured to cause the second computer to transmit video data representing a desktop image of the second computer to the emulated second mass storage device and to receive user input device data from the emulated user input device.

6. The KVM switch of claim 5, wherein the switching structure further selectively connect audio data between the console port and the selected computer port,
wherein the client-side remote control program is further configured to cause the first computer to receive audio data from the emulated first mass storage device, and
wherein the server-side remote control program is further configured to cause the second computer to transmit audio data to the emulated second mass storage device.

7. A method implemented in a keyboard, video, mouse (KVM) switch apparatus for accessing two or more computers by a user console, the KVM switch apparatus including a KVM switch, the user console connected to a console port of the KVM switch, and a plurality of computers connected to a plurality of computer ports of the KVM switch, the method comprising:
(a) storing a client-side remote control program and a server-side remote control program;
(b) receiving a first user command to access a selected first computer connected to a first computer port;
(c) in response to the first user command, connecting the first computer port to the console port to transfer video data and user input device data between the console port and the first computer port;
(d) emulating a first mass storage device complying with a predetermined communication protocol for the first computer port and transferring a client-side remote control program to the emulated first mass storage device for execution by the first computer;
(e) receiving a second user command to access a selected second computer connected to a second computer port;
(f) in response to the second user command, emulating a second mass storage device and a user input device complying with the predetermined communication protocol for the second computer port and transferring a server-side remote control program to the emulated second mass storage device for execution by the second computer; and (g) transferring data between the emulated first mass storage device and the emulated second mass storage device and user input device.

8. The method of claim 7, wherein the predetermined communication protocol is the Universal Serial Bus (USB) protocol.

9. The method of claim 7, wherein the emulated first and second mass storage devices are CD-ROM devices.

10. The method of claim 9,
wherein step (a) further includes storing first and second auto-run files,
wherein step (d) further includes transferring the first auto-run file to the emulated first CD-ROM device, and
wherein step (f) further includes transferring the second auto-run file to the emulated second CD-ROM device.

11. The method of claim 7,
wherein the client-side remote control program is configured to cause the first computer to transmit user input device data to the emulated first mass storage device and to receive video data from the emulated first mass storage device, and
wherein the server-side remote control program is configured to cause the second computer to transmit video data representing a desktop image of the second computer to the emulated second mass storage device and to receive user input device data from the emulated user input device.

12. The method of claim 11, wherein step (c) further includes transferring audio data between the console port and the first computer port,
wherein the client-side remote control program is further configured to cause the first computer to receive audio data from the emulated first mass storage device, and
wherein the server-side remote control program is further configured to cause the second computer to transmit audio data to the emulated second mass storage device.

13. The method of claim 7, further comprising:
(h) receiving a third user command to release access of the second computer; and
(i) in response to the third user command, emulating a removal event to remove the emulated second mass storage device and user input device.

14. The method of claim 7, further comprising:
(j) receiving a fourth user command to access a selected third computer connected to a third computer port;
(k) in response to the fourth user command, emulating a third mass storage device and a user input device complying with the predetermined communication protocol for the third computer port and transferring a server-side remote control program to the emulated third mass storage device for execution by the third computer; and
(l) transferring data between the emulated first mass storage device and the emulated third mass storage device and user input device.

15. The method of claim 7, further comprising:
(m) receiving a fifth user command to release access of the first computer and maintain access to the second computer port;
(n) in response to the fifth user command, emulating removal events to remove the emulated first mass storage device and remote the emulated second mass storage device and the user input device, the KVM switch further connecting the second computer port to the console port to transfer video data and user input device data between the console port and the second computer port.

16. A method implemented in a keyboard, video, mouse (KVM) switch apparatus for accessing two or more computers by a user console, the KVM switch apparatus including a KVM switch, the user console connected to a console port of the KVM switch, and a plurality of computers connected to a plurality of computer ports of the KVM switch, the method comprising:
(a) the user console issuing a first user command to access a selected first computer connected to a first computer port;
(b) in response to the first user command, the KVM switch connecting the first computer port to the console port to transfer video data and user input device data between the console port and the first computer port;
(c) the first computer transmitting video data of its desktop image to the user console via the KVM switch;
(d) the user console displaying the video data received via the KVM switch on a console monitor;
(e) the KVM switch emulating a first mass storage device complying with a predetermined communication protocol for the first computer port and transferring a client-side remote control program to the emulated first mass storage device for execution by the first computer;
(f) the user console issuing a second user command to access a selected second computer connected to a second computer port;
(g) in response to the second user command, the KVM switch emulating a second mass storage device and a user input device complying with the predetermined communication protocol for the second computer port and transferring a server-side remote control program to the emulated second mass storage device for execution by the second computer;
(h) the KVM switch transferring data between the emulated first mass storage device and the emulated second mass storage device and user input device;
(i) the second computer executing the server-side remote control program to transmit video data representing a desktop image of the second computer to the emulated second mass storage device and to receive user input device data from the emulated user input device;
(j) the first computer executing the client-side remote control program to transmit user input device data to the emulated first mass storage device and to receive video data from the emulated first mass storage device; and
(k) the first computer continuing to transmitting video data of its desktop image, including a desktop image of the second computer, to the user console via the KVM switch.

17. The method of claim 16, wherein the predetermined communication protocol is the Universal Serial Bus (USB) protocol.

18. The method of claim 16, wherein the emulated first and second mass storage devices are CD-ROM devices.

19. The method of claim 18,
wherein step (e) further includes transferring a first auto-run file to the emulated first CD-ROM device, and
wherein step (g) further includes transferring a second auto-run file to the emulated second CD-ROM device.

20. The method of claim 16, further comprising:
(l) the user console issuing a third user command to release access of the second computer; and
(m) in response to the third user command, the KVM switch emulating a removal event to remove the emulated second mass storage device and user input device.

21. The method of claim 16, further comprising:
(n) the user console issuing a fourth user command to access a selected third computer connected to a third computer port;

(o) in response to the fourth user command, the KVM switch emulating a third mass storage device and a user input device complying with the predetermined communication protocol for the third computer port and transferring a server-side remote control program to the emulated third mass storage device for execution by the third computer;

(p) the KVM switch transferring data between the emulated first mass storage device and the emulated third mass storage device and user input device; and (q) the third computer executing the server-side remote control program to transmit video data representing a desktop image of the third computer to the emulated third mass storage device and to receive user input device data from the emulated user input device.

22. The method of claim 16, further comprising:

(r) the user console issuing a fifth user command to release access of the first computer and maintain access to the second computer port; and (s) in response to the fifth user command, the KVM switch emulating removal events to remove the emulated first mass storage device and remove the emulated second mass storage device and the user input device, the KVM switch further connecting the second computer port to the console port to transfer video data and user input device data between the console port and the second computer port.

23. The method of claim 16, wherein step (b) further includes the KVM switch transferring audio data between the console port and the first computer port, wherein step (c) further includes the first computer transmitting audio data to the user console via the KVM switch, wherein step (d) further includes the user console playing the audio data received via the KVM switch on a console speaker, wherein step (i) further includes the second computer transmitting audio data to the emulated second mass storage device, wherein step (j) further includes the first computer receiving audio data from the emulated first mass storage device, and wherein step (k) further includes the first computer continuing to transmitting audio data to the user console via the KVM switch.

* * * * *